United States Patent [19]

Yamada et al.

[11] 4,338,636
[45] Jul. 6, 1982

[54] METHOD FOR REPRODUCING PICTURES FROM ORIGINAL PICTURES DEPENDING ON THE DESIRED LAYOUT

[76] Inventors: Mitsuhiko Yamada, 6 Goto-cho, Ogurusu-minami, Fushimi-ku, Kyoto; Toshiaki Nakade, 19 Doinouchi-cho, Mibu, Nakagyo-ku, Kyoto, both of Japan

[21] Appl. No.: 175,836

[22] Filed: Aug. 6, 1980

[30] Foreign Application Priority Data

Aug. 16, 1979 [JP] Japan ................................ 54-103514

[51] Int. Cl.³ .............................................. H04N 1/00
[52] U.S. Cl. ...................................... 358/256; 358/75
[58] Field of Search ...................... 358/256, 75; 354/5, 354/6, 7, 11.

[56] References Cited

U.S. PATENT DOCUMENTS 4,214,276 7/1980 Pugsley et al. .................... 358/256

Primary Examiner—Richard Murray

[57] ABSTRACT

A method is described for reproducing pictures on a photosensitive material from original pictures depending on the desired layout. A plurality of original pictures are scanned in parallel by means of picture scanning means to obtain rows of picture signals. The picture signals obtained are aligned in series depending on the desired layout, and the picture signals are used to record aligned reproduction pictures on the photosensitive material in the desired layout positions by means of a picture recording means.

5 Claims, 12 Drawing Figures

METHOD FOR REPRODUCING PICTURES FROM ORIGINAL PICTURES DEPENDING ON THE DESIRED LAYOUT

BACKGROUND OF THE INVENTION

This invention relates to a method for reproducing pictures on a photosensitive material from original pictures depending on the desired layout.

In a conventional picture reproducing machine such as a color scanner or a color facsimile, a plurality of original pictures having different characteristics such as color tone, density, gradation, and so forth, cannot be recorded on the same recording film because the color conditions of each original picture are properly varied. Thus, the original pictures are reproduced one by one according to the desired magnification scale and the reproduction conditions, that is, only one original picture is fixed to the color scanner and its reproduction conditions are set up in a single operation.

In such a method, while the reproduction conditions are being set up, the color scanner cannot be operated for the reproduction, which is inconvenient and reduces the speed of operation. Further, since one original picture is processed in a single operation, the recording film, still having space for reproduction, must be processed, this being uneconomical and time consuming.

SUMMARY OF THE INVENTION

Therefore, it is an object of the present invention to provide a method for reproducing pictures on a photosensitive material from original pictures depending on the desired layout free from the aforementioned defects, which is reliable, quick and economical, and increases the rate of operation of a picture reproducing machine.

According to the present invention there is provided a method for reproducing pictures on a photosensitive material from original pictures depending on the desired layout, comprising the steps of (a) scanning a plurality of original pictures in parallel by means of picture scanning means to obtain rows of picture signals, (b) aligning the picture signals in series depending on the desired layout, and (c) recording reproduction pictures on a photosensitive material in the desired layout positions by the picture signals aligned by means of a picture recording means.

BRIEF DESCRIPTION OF DRAWINGS

The present invention will become more clear from the following description of a preferred embodiment thereof with reference to the accompanying drawings, in which.

DESCRIPTION OF A PREFERRED EMBODIMENT

Figure 1:
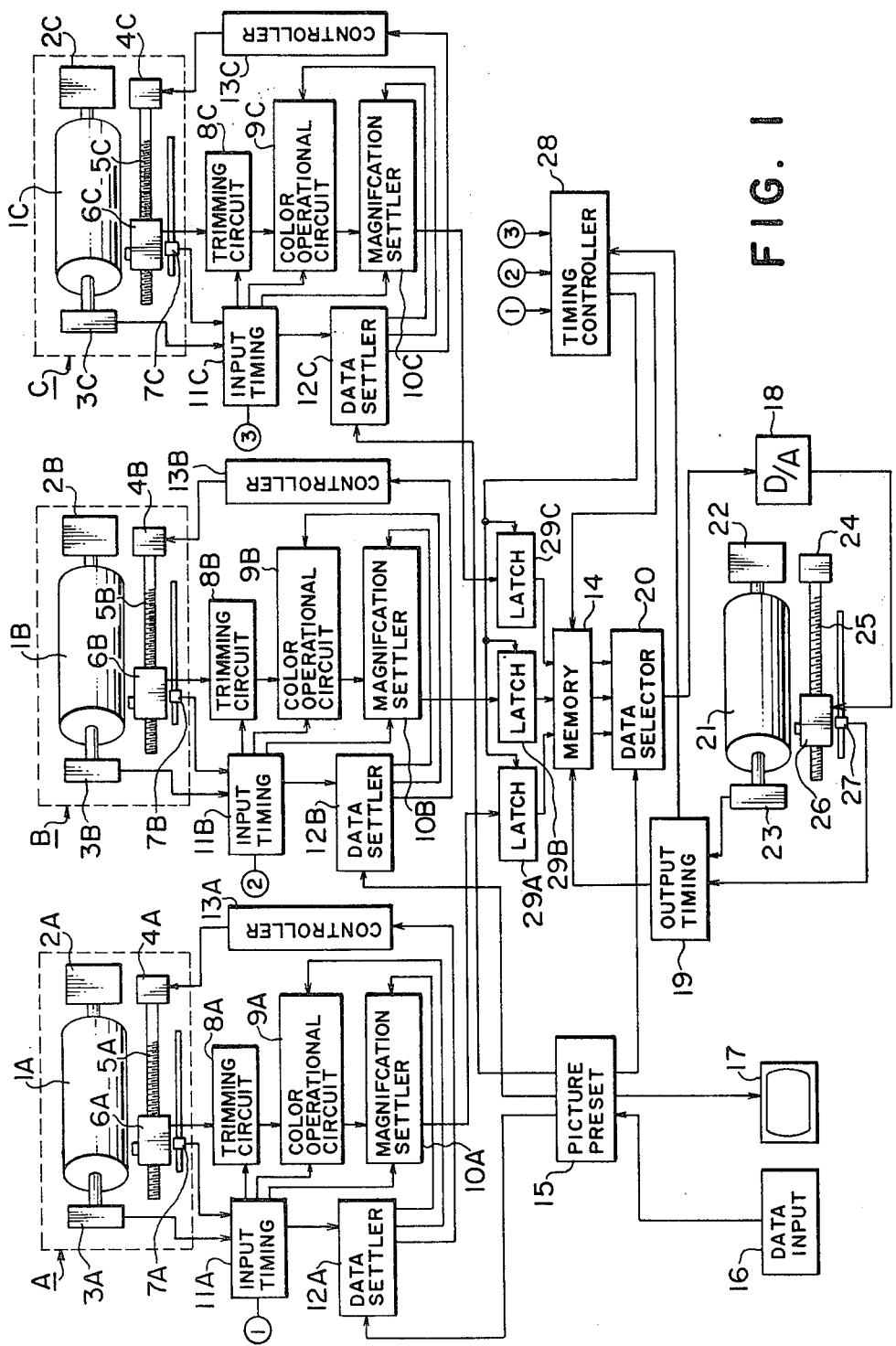
FIG. 1 is a schematic diagram of a picture reproducing machine which carries out a method according to the present invention.

Referring now to the drawings, there is shown in FIG. 1 a picture reproducing machine carrying out a method according to the present invention.

Each input part or a picture scanning means A, B or C comprises a picture cylinder 1A, 1B or 1C on which original pictures are to be mounted, a motor 2A, 2B or 2C for driving the picture cylinder through a drive shaft, a pulse generator 3A, 3B or 3C such as a rotary encoder, mounted to the drive shaft, a screw rod 5A, 5B or 5C driven by a motor 4A, 4B or 4C, a picture scanning head 6A, 6B or 6C, and a pulse generator 7A, 7B or 7C such as a linear encoder. The pulse generators 3A, 3B and 3C and 7A, 7B and 7C generator pulse signals to input timing circuits 11A, 11B and 11C. The input timing circuits 11A, 11B and 11C send timing pulses and clock pulses to trimming circuits 8A, 8B and 8C, color operational circuits 9A, 9B and 9C, magnification settlers 10A, 10B and 10C, and data settlers 12A, 12B and 12C.

Prior to mounting the original pictures onto the picture cylinders 1A–1C, the following steps are carried out. The picture numbers and the sizes of the trimming parts of the original pictures, as shown in FIG. 2a–2h, are inputs to a picture preset means 15 by a data input means 16 such as a keyboard, and at the same time the reproducing color conditions and the magnifications of the original pictures are also inputs to the picture preset means 15 by the data input means 16.

Figure 2:
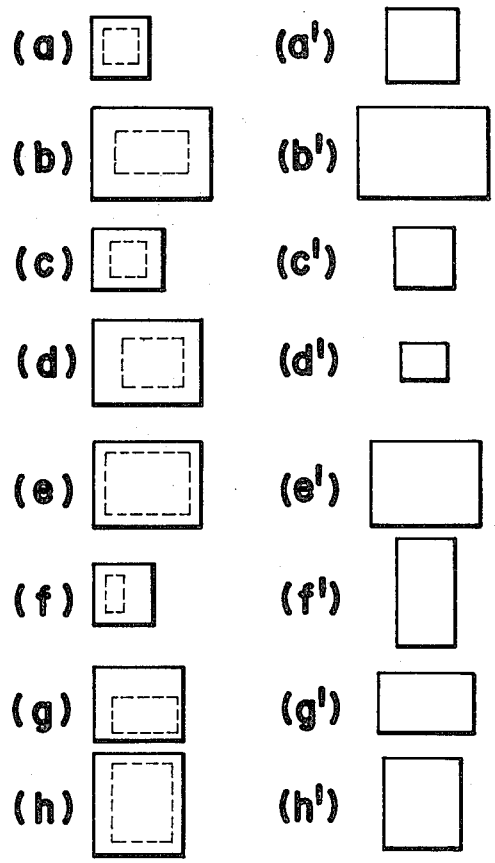
FIG. 2 shows original pictures and their trimming parts multiplied by magnifications.
Figure 3:
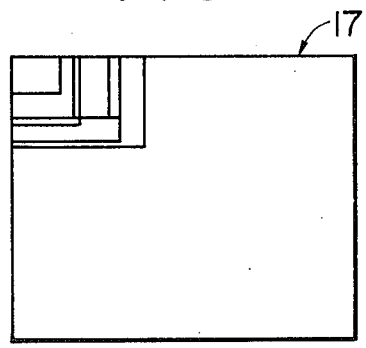
FIGS. 3 and 4 show the trimming parts of the original pictures shown on a display means.

Then, the picture preset means 15 outputs signals corresponding to the trimming picture images shown in FIG. 2a'–2h', which are obtained by multiplying the reproduction scales to the trimming parts of the original pictures, together with the picture numbers, and, as shown in FIG. 3, the trimming picture images are displayed on a display means 17 such as a cathode ray tube (CRT), showing the ratios of the trimming picture image sizes to the display area of the display means 17, which corresponds to the entire surface of a recording film.

Figure 4:
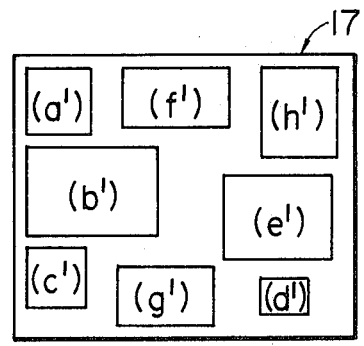

The trimming picture images are arranged properly in the display means 17 depending on the desired layout by an operational lever such as a joy stick, as shown in FIG. 4. In this operation, by using a micro-computer the best display of the trimming picture images may be determined. On this occasion, the space for recording register marks for positioning, and for the necessary time for varying the reproduction conditions of the pictures, should be taken around each trimming picture image.

Then, it is decided which of the original pictures corresponding to the trimming picture images are to be mounted on the picture cylinders 1A–1C. For example, the original pictures a, b and c corresponding to the trimming picture images a', b' and c' are mounted on the separated cylinders 1A, 1B and 1C, respectively, because the three trimming picture images are aligned along a vertical line in FIG. 4. Then, since the three trimming picture images f', b' and g' are aligned along a vertical line in FIG. 4, the original pictures f and g corresponding to the trimming picture images f' and g' are mounted on the cylinders 1A and 1C, respectively. The original pictures h, e and d corresponding to the trimming picture images h', e' and d' which are aligned along a vertical line in FIG. 4, are mounted on the cylinders 1A, 1B and 1C, respectively, in the same manner as described above.

Figure 5:
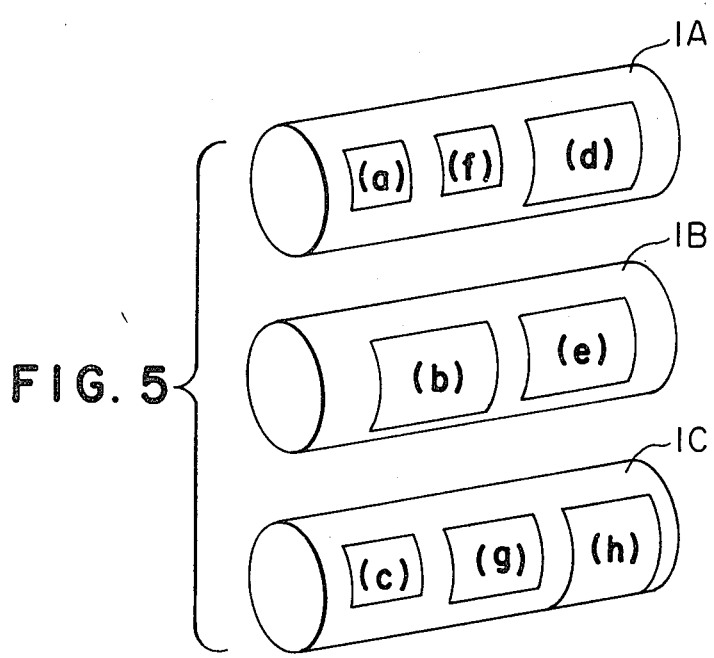
FIG. 5 is a perspective view of picture cylinders shown in FIG. 1, on which the original pictures are mounted.

This information described above is an input to the picture preset means 15 by the data input means 16, and then the original pictures a-h are mounted on the picture cylinders 1A-1C, as shown in FIG. 5. The reproducing conditions such as color tone, color correction, gradation, highlight and shadow point densities, and so forth, may be obtained by using a color control simulator, as disclosed in the Japanese Patent Laying-Open Specification No. 55-79448 (Japanese patent application No. 53-155954).

Such reproducing conditions and the magnifications for the original pictures are inputs to registers of the data settlers 12A, 12B and 12C via the data input means 16 and the picture preset means 15, as hereinafter described.

Figure 6:
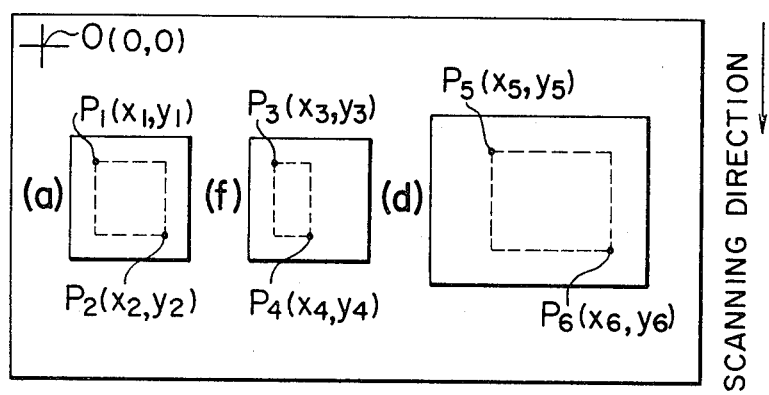
FIG. 6 is an exploded view of one of picture cylinders including the original pictures mounted thereon.

In FIG. 6 there is shown an exploded view of the surface of the picture cylinder 1A together with the original pictures a, f and d mounted thereon. Each original picture a, f or d includes a trimming part in which trimming points $P_1(x_1,y_1)$ and $P_2(x_2,y_2)$; $P_3(x_3,y_3)$ and $P_4(x_4,y_4)$; or $P_5(x_5,y_5)$ and $P_6(x_6,y_6)$ are positioned in the upper left and the lower right corners. These trimming points are detected by a viewer (not shown) attached to the scanning head 6A, and their distances from an origin 0(0,0) which are marked on the picture cylinder 1A, are counted by the pulse generators 3A and 7A as the pulse numbers in the directions of the cylinder's axis and the cylinder's periphery.

The coordinates of the trimming points, which are represented by the pulse numbers counted by the pulse generators 3A and 7A, are settled in the trimming circuit 8A, in advance. The setting of the trimming points of the original pictures mounted on the other picture cylinders 1B and 1C into the trimming circuits 8B and 8C is carried out in the same manner as above. By using a spare cylinder the mounting of the original pictures and the setting of the trimming points may be performed in a separate place.

Figure 7:
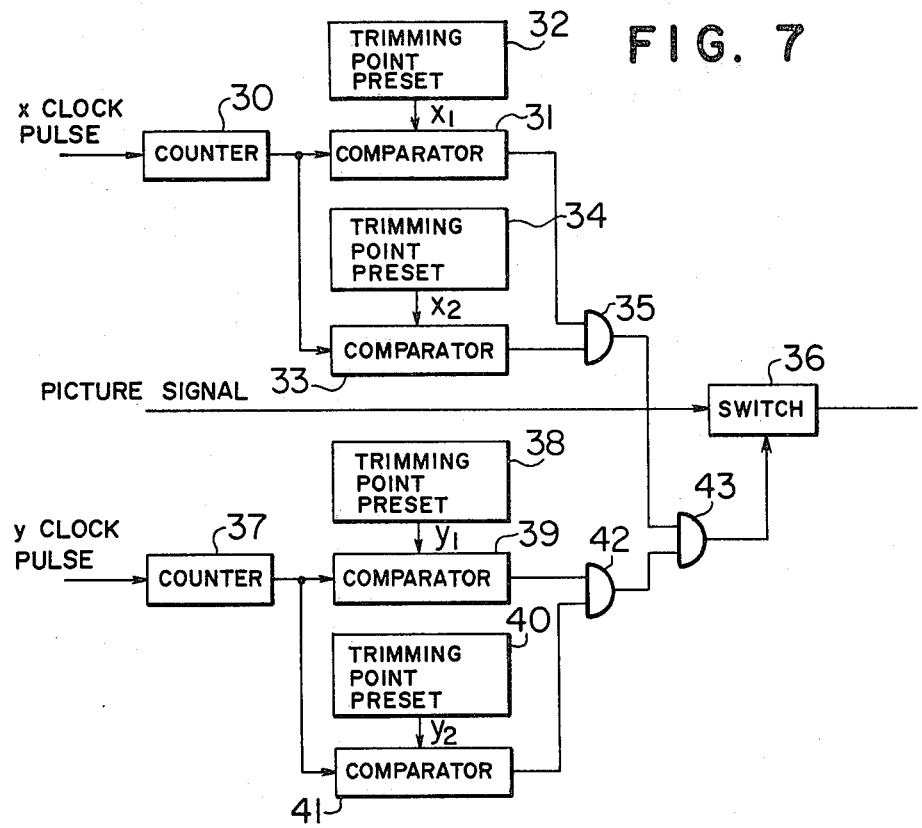
FIG. 7 is a block diagram of a part of a trimming circuit shown in FIG. 1.

In FIG. 7 there is shown a part of the trimming circuit 8A, 8B or 8C. Each original picture requires one trimming circuit. Assuming that the trimming circuit 8A for the original picture is partly shown in FIG. 7, counters 30 and 37 count numbers of x and y clock pulses sent from the pulse generators 3A and 7A via the input timing circuit 11A. In trimming point preset means 32, 34, 38 and 40 the coordinates $x_1$, $x_2$, $y_1$ and $y_2$ of the trimming points $P_1$ and $P_2$ of the picture a are settled. Numerals 31, 33, 39 and 41 denote comparators.

The comparator 31 compares the count number x in the counter 30 with the value $x_1$ set in the preset means 32, and outputs a high level signal H when the count number x is at least equal to the value $x_1$. The other comparators 33, 39 and 41 output the high level signal H when the count number x is at most $x_1$, when the count number y is at least equal to $y_1$, or when the count number y is at most $y_2$, in the same manner as the comparator 31.

Numerals 35, 42 and 43 denote AND gates. A switch circuit 36 passes the picture signal only when the AND gate 43 outputs the high level signal H to the switch circuit 36.

Accordingly, as shown in FIG. 5, when the original pictures mounted on each picture cylinder 1A, 1B or 1C are scanned photoelectrically, each trimming circuit 8A, 8B or 8C outputs picture signals corresponding to the trimming parts in order of the scanning lines.

Before the picture signals are issued from the trimming circuits 8A, 8B and 8C to the color operational circuits 9A, 9B and 9C, the reproduction conditions of the original pictures, which are stored from the picture preset means 15 into shift registers of the data settlers 12A, 12B and 12C, are settled in the color operational circuits 9A, 9B and 9C as follows.

Figure 8:
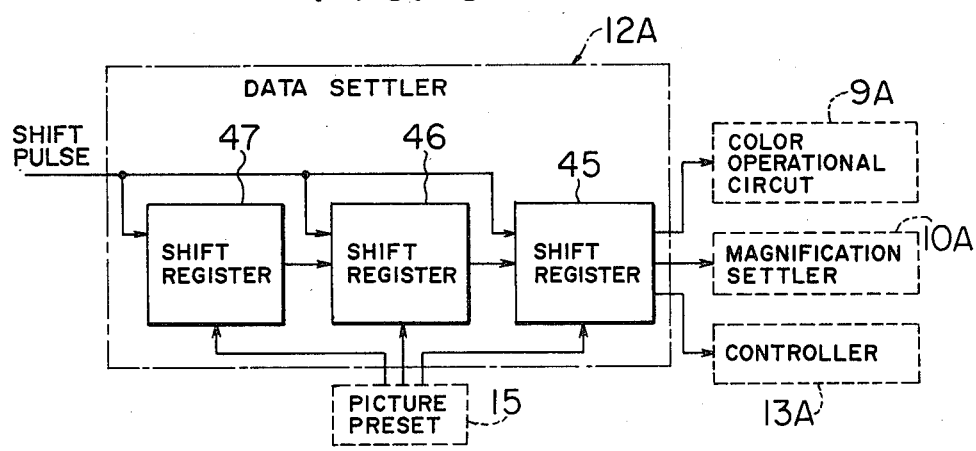
FIG. 8 is a block diagram of a part of a data settler shown in FIG. 1.

In FIG. 8 there is shown one embodiment of the data settler 12A, 12B or 12C which comprises three shift registers 45, 46 and 47, each storing the reproduction conditions and the magnification of the original picture a, f or d. On this occasion, the reproduction conditions of the original picture a to be firstly scanned are provided from the shift register 45 into the color operational circuit 9A. Then, the reproduction conditions of the original pictures f and d will be transferred consecutively from the data settler 12A to the color operational circuit 9A, as hereinafter mentioned.

Figure 9:
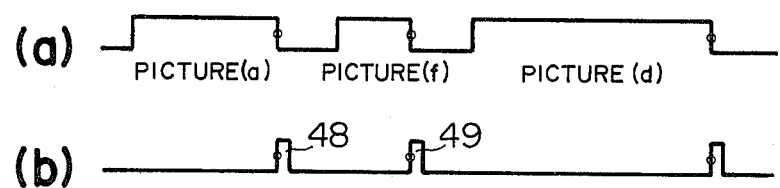
FIG. 9 shows shift pulses which control the data settler shown in FIG. 1.

In FIG. 9a there are shown gate signals for the original pictures a, f and d, which are issued from the trimming circuit 8A, (the one for the picture A is issued from the AND gate 35 in FIG. 7). From the gate signals in FIG. 9a shift pulses 48 and 49 are prepared, as shown in FIG. 9b. The reproduction conditions of the original pictures f and d are adapted to be shifted from the shift registers 46 and 47 to the ones 45 and 46 by means of the shift pulse 48, and then the reproduction conditions of the original picture d are adapted to be shifted from the shift register 46 to the one 45 by means of the shift pulse 49.

In addition, the magnifications for the original pictures mounted to each picture cylinder 1A, 1B or 1C except the first one a, b or c, are settled into the magnification settler 10A, 10B or 10C and a controller 13A, 13B or 13C by means of the same shift pulses as those which are used when the reproduction conditions of the original pictures are settled in the color operational circuit 9A, 9B or 9C. The color operational circuit 9A, 9B or 9C carries out a color control operation such as a masking, a color correction, a gradation control, and so forth. One embodiment of such a color operational circuit is disclosed in Japanese patent application No. 54-49077.

The controller 13A, 13B or 13C controls the motor 4A, 4B or 4C which controls the moving speed of the picture scanning head 6A, 6B or 6C depending on a reproduction scale with reference to the recording head 26 hereinafter mentioned. The magnification settler 10A, 10B or 10C controls the magnification scale by repeating or skipping picture signals read out of a memory periodically, as disclosed in Japanese Patent Laying-Open Specification No. 54-65601 (Japanese patent application No. 52-131366).

Figure 10:
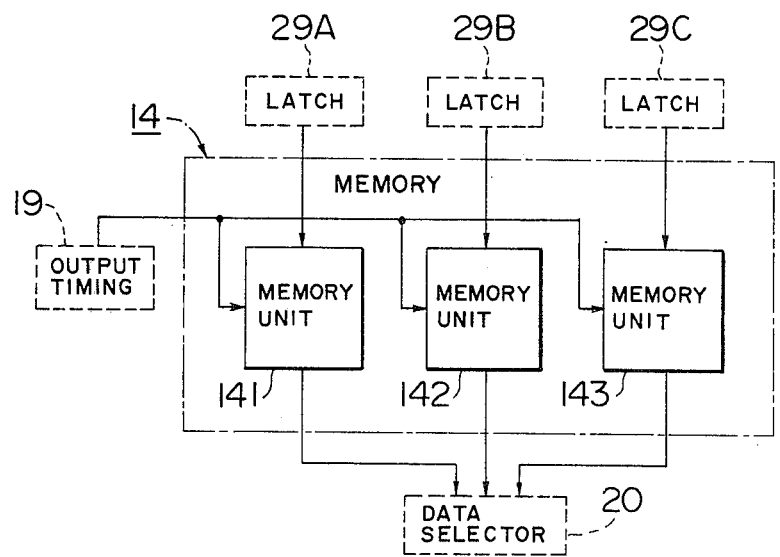
FIG. 10 is a block diagram of a memory shown in FIG. 1.

Thus, the magnification-controlled picture signals which are sent from the magnification settlers 10A, 10B and 10C, are once latched in latch circuits 29A, 29B and 29C, and then are written sequentially in memory units 141, 142 and 143 such as one-line buffer memories of the memory 14, as shown in FIG. 10. The writing timing of the picture signals are controlled by a timing controller 28 so as not to meet with the reading timing.

Figure 11:
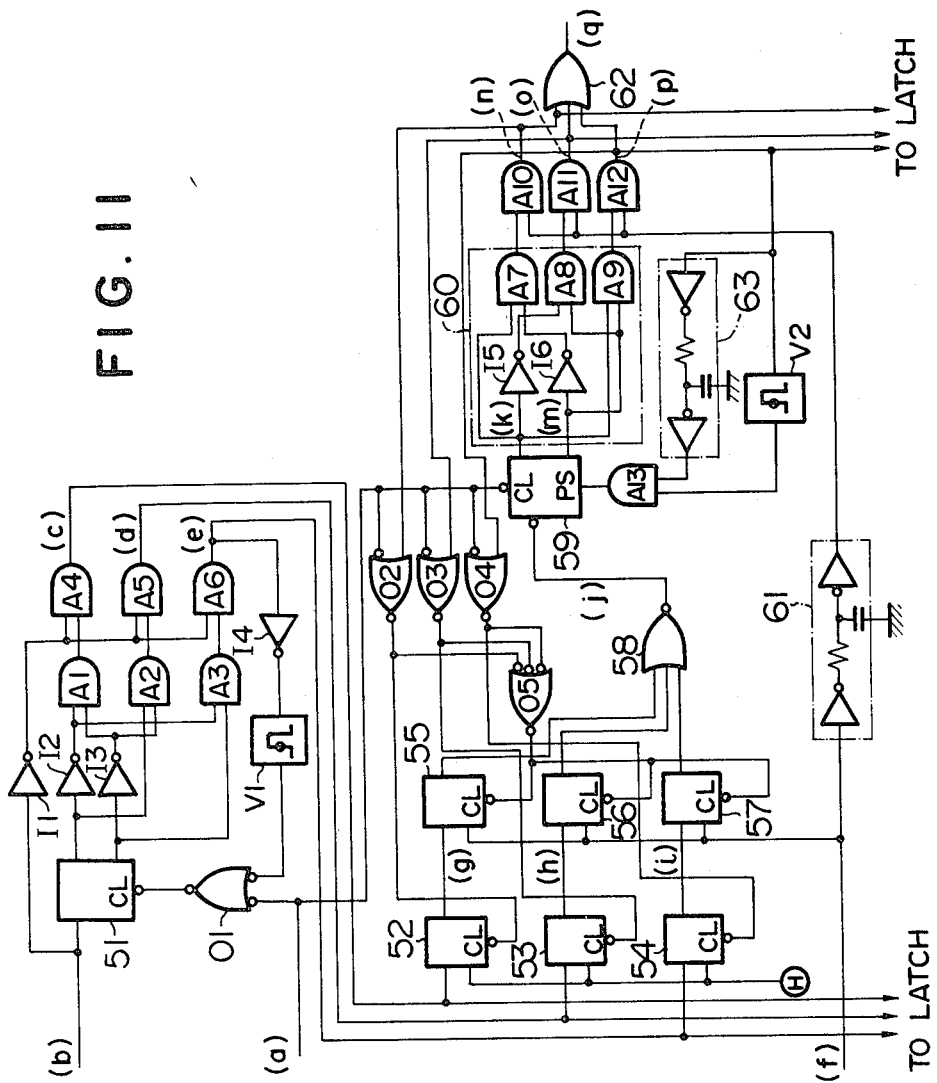
FIG. 11 shows an embodiment of one of three timing controller units of a timing controller shown in FIG. 1.
Figure 12:
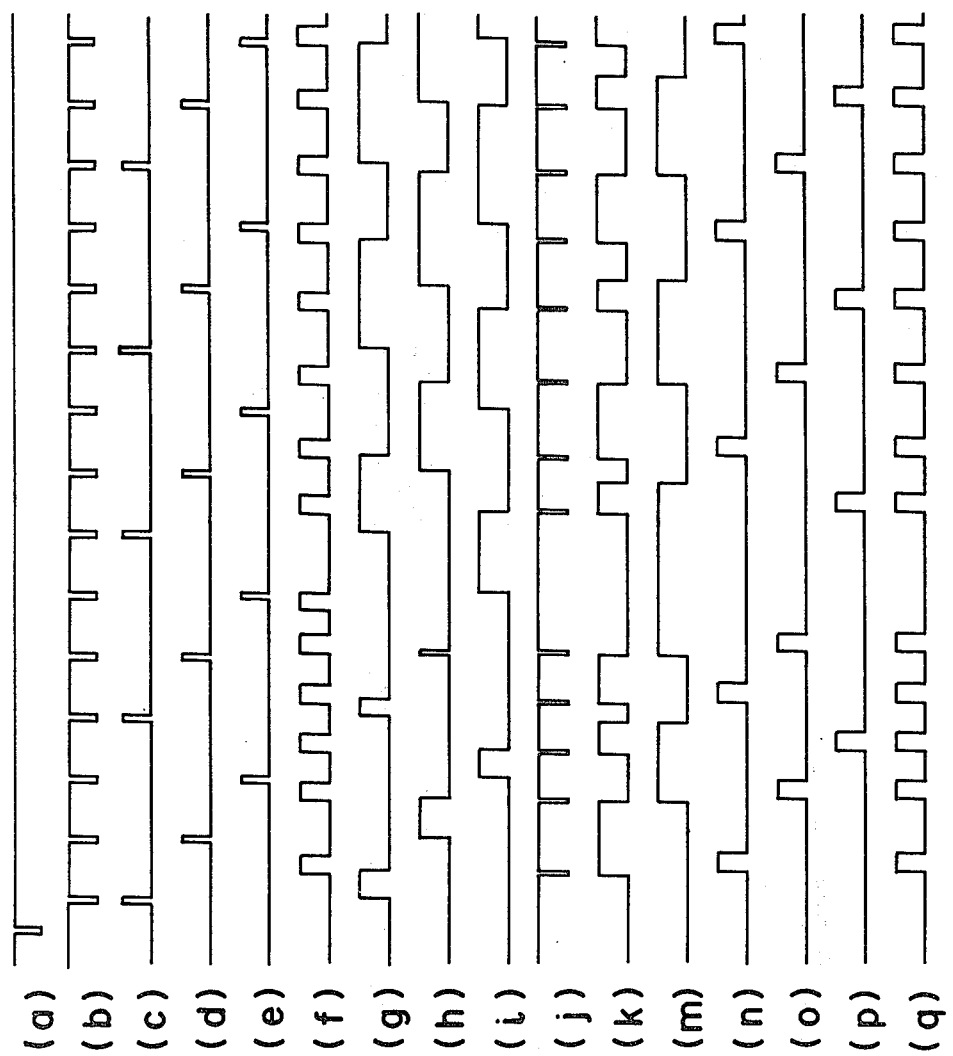
FIG. 12 is a time chart of pulses appeared in FIG. 11.

There are shown in FIG. 11 one of three timing controller units of the timing controller 28 and in FIG. 12 a time chart of pulses identified in FIG. 11. It will be explained with respect to one of the three picture scanning means A, B and C.

A start pulse signal a, shown in FIG. 12(a), generated by the pulse generator 3A is sent to the timing controller 28 via the input timing circuit 11A. A clock pulse signal b, shown in FIG. 12(b), which is sent from the input timing circuit 11A, is separated into three pulse signals c, d and e shown in FIG. 12(c) (d) (e) by a combination of a base 3 counter 51, inverters I1–I3, and AND gates A1–A6. The counter 51 is cleared by the pulse signal e which is fed to the counter 51 via an inverter I4, a one-shot multi-vibrator V1 and an OR gate O1.

The pulse signals c, d and e are fed to a terminal of D-type flip-flop circuits 52, 53 and 54 (hereinafter referred to as F/F circuit) which output pulse signals g, h and i shown in FIG. 12(g) (h) (i). The other terminals of the F/F circuits 52, 53 and 54 are maintained to the high level, and are cleared by output signals of OR gates O2, O3 and O4.

The pulse signals g, h and i are then sent to F/F circuits 55, 56 and 57 which are controlled by a clock pulse signal f shown in FIG. 12(f), which is generated by an output timing circuit 19. When the clock pulse signal f is in high level, the F/F circuit 55, 56 or 57 outputs a high level signal to an OR gate 58 which outputs a signal j shown in FIG. 12(j).

A base 3 counter 59 counts the output signal j sent from the OR gate 58, and outputs signals k and m shown in FIG. 12(k) (m). The output signals k and m are separated into three signals by a decoder 60 which comprises a combination of inverters I5 and I6, and AND gates A7–A9. The three signals separated in the decoder 60 are fed to AND gates A10–A12 which are controlled by the clock pulse f sent from the output timing circuit 19 to the AND gate A10–A12 via a delay circuit 61. The AND gates A10–A12 output pulse signals n, o and p shown in FIG. 12(n) (o) (p) to an OR gate 62 which outputs a writing pulse signal q shown in FIG. 12(q).

The output signals n, o and p are sent to the OR gates O2, O3 and O4. The output signals of the OR gates O2, O3 and O4 are fed to the OR gate O5. The pause set of the counter 59 is carried out by the output signal p which is supplied from the AND gate 12 to the counter 59 via a one-shot multi-vibrator V2 and an AND gate A13, and the timing of the pause set of the counter 59 is delayed by a delay circuit 63.

By the writing pulse signals obtained as described above, the three sets of picture signals which are once latched in the latch circuits 29A, 29B and 29C, are stored in order of address numbers into the corresponding memory units 141, 142 and 143 of the memory 14 in the same time.

Then, the three sets of the picture signals stored in the memory units 141, 142 and 143 are read out simultaneously in the order of the address numbers by a reading pulse generated by the output timing circuit 19. One of the three sets of picture signals read out are selected in a data selector 20 according to a layout position signal sent from the picture preset means 15.

Thus, the selected picture signals are converted into analog picture signals in a digital-analog converter 18. By these analog picture signals the recording head 26 is controlled so that the reproduction pictures may be reproduced onto a recording film mounted on a recording cylinder 21 according to the desired layout.

The recording cylinder 21 is driven by a motor 22 around a drive shaft. A pulse generator 23 such as a rotary encoder is attached to the drive shaft and outputs pulse signals to the output timing circuit 19. The recording head 26 is moved in a recording cylinder's axis by a screw rod 25 and a motor 24 which drives the screw rod 25. The position of the recording head 26 is detected by a pulse generator 27 such as a linear encoder which sends position signals to the output timing circuit 19.

Although the present invention has been shown and described in terms of a preferred embodiment, however, various changes and modifications can be made by a person skilled in the art without departing from the scope of the present invention.

For example, the picture scanning means may not be restricted to three, and a plurality of picture scanning means may be applied to the present invention.

What is claimed is:

1. A method for reproducing pictures on a photosensitive material from original pictures depending on the desired layout, comprising the steps of:
    (a) scanning a plurality of original pictures in parallel by means of picture scanning means to obtain rows of picture signals;
    (b) aligning the picture signals in series depending on the desired layout; and
    (c) recording reproduction pictures on a photosensitive material in the desired layout positions by the picture signals aligned by means of a picture recording means.

2. A method as defined in claim 1, wherein the rows of picture signals are once stored in a memory.

3. A method as defined in claim 1 or 2, wherein the reproduction scale of each original picture is variable.

4. A method as defined in claim 3, wherein the reproduction conditions of each original picture are varied.

5. A method as defined in claim 4, wherein trimming of each original picture is carried out.

* * * * *